(12) United States Patent
Kim

(10) Patent No.: US 7,753,674 B2
(45) Date of Patent: Jul. 13, 2010

(54) APPARATUS AND METHOD FOR FABRICATING FLAT PANEL DISPLAY DEVICE

(75) Inventor: Jin Wuk Kim, Uiwang-si (KR)

(73) Assignee: LG. Display Co., Ltd., Seoul (KR)

( * ) Notice: Subject to any disclaimer, the term of this patent is extended or adjusted under 35 U.S.C. 154(b) by 35 days.

(21) Appl. No.: 11/320,210

(22) Filed: Dec. 27, 2005

(65) Prior Publication Data

US 2006/0275674 A1 Dec. 7, 2006

(30) Foreign Application Priority Data

Jun. 7, 2005 (KR) .................. 10-2005-0048613

(51) Int. Cl.
*B29C 59/00* (2006.01)
*G03F 1/00* (2006.01)

(52) U.S. Cl. .................. 425/385; 425/470; 425/810; 430/5

(58) Field of Classification Search ........... 425/385, 425/403, 90, 375, 470, 810; 299/134; 106/38.2, 106/38.22, 38.27, 38.9; 249/114.1, 115, 249/134; 264/1.1, 1.5, 219, 337, 338, 494, 264/496; 430/5, 320, 321
See application file for complete search history.

(56) References Cited

U.S. PATENT DOCUMENTS

| | | | | |
|---|---|---|---|---|
| 5,259,926 A | * | 11/1993 | Kuwabara et al. | ............. 216/54 |
| 5,408,247 A | * | 4/1995 | Enomoto et al. | ............. 345/100 |
| 5,462,700 A | * | 10/1995 | Beeson et al. | ............... 264/1.27 |
| 5,543,949 A | * | 8/1996 | Machida et al. | ............. 349/123 |
| 5,596,435 A | * | 1/1997 | Sunohara et al. | ............. 349/132 |
| 6,020,047 A | * | 2/2000 | Everhart | ..................... 428/209 |
| 6,025,449 A | * | 2/2000 | Enomoto et al. | ............. 526/320 |
| 6,154,265 A | * | 11/2000 | Kamio et al. | ................ 349/122 |
| 6,190,929 B1 | * | 2/2001 | Wang et al. | ................... 438/20 |
| 6,366,333 B1 | * | 4/2002 | Yamamoto et al. | .......... 349/113 |
| 6,517,995 B1 | * | 2/2003 | Jacobson et al. | ............. 430/320 |

(Continued)

FOREIGN PATENT DOCUMENTS

EP  1 072 954 A2  7/2000

(Continued)

OTHER PUBLICATIONS

Lee et al., Solvent Compability of PDMS-Based Microfluidic Device, Dec. 1, 2003, American Chemical Society, Analytical Chemistry, vol. 75 No. 23, pp. 6544-6554.*

(Continued)

*Primary Examiner*—Philip C Tucker
*Assistant Examiner*—Dimple N Bodawala
(74) *Attorney, Agent, or Firm*—Brinks Hofer Gilson & Lione

(57) ABSTRACT

A method and apparatus for fabricating a flat panel display device is disclosed. A thin film is patterned in a patterning process using a soft mold without using a photo process. A thin film layer and a resist are sequentially formed on a substrate. A designated resist pattern is formed by applying pressure to the resist using a soft mold. The resist has a dipole moment $\mu$ value equal to or higher than 2(D), or has a solubility parameter value lower than $6\,(cal/cm^3)^{1/2}$ or higher than $11\,(cal/cm^3)^{1/2}$.

5 Claims, 4 Drawing Sheets $6 > \delta$ or $\delta > 11$
OR $\mu > 2$

U.S. PATENT DOCUMENTS

| | | | |
|---|---|---|---|
| 6,551,749 B1 * | 4/2003 | Minagawa et al. | 430/5 |
| 6,642,341 B1 * | 11/2003 | Spitler et al. | 528/44 |
| 6,656,544 B1 * | 12/2003 | Ishikawa et al. | 428/32.1 |
| 6,897,303 B2 * | 5/2005 | Yamada | 536/58 |
| 6,943,861 B2 * | 9/2005 | Tomioka et al. | 349/141 |
| 7,139,063 B2 * | 11/2006 | Choi et al. | 349/188 |
| 2002/0127499 A1 * | 9/2002 | Endo et al. | 430/327 |
| 2004/0125272 A1 * | 7/2004 | Chung et al. | 349/73 |
| 2004/0142836 A1 * | 7/2004 | Park et al. | 510/175 |
| 2004/0229140 A1 * | 11/2004 | Kim | 430/7 |
| 2005/0123850 A1 * | 6/2005 | Wolk | 430/199 |
| 2005/0139576 A1 * | 6/2005 | Kim | 216/23 |
| 2005/0189883 A1 * | 9/2005 | Suh et al. | 315/169.3 |
| 2005/0258571 A1 * | 11/2005 | Dumond et al. | 264/293 |
| 2005/0264710 A1 * | 12/2005 | Kim et al. | 349/42 |
| 2005/0282402 A1 * | 12/2005 | Kim | 438/780 |
| 2006/0275018 A1 * | 12/2006 | Chae | 385/147 |

FOREIGN PATENT DOCUMENTS

| | | | |
|---|---|---|---|
| EP | 1630605 A1 * | 3/2006 | |
| EP | 1645605 A1 * | 4/2006 | |
| JP | 07181439 A * | 7/1995 | |
| JP | 2001191345 A * | 7/2001 | |
| WO | WO 2004008473 A1 * | 1/2004 | |

OTHER PUBLICATIONS

Hata et al.; Viscoelastic Properties of Epoxy resin I. Effect of Prepolymer Strucutre on Viscoelastic properties; 1971; Journal of Applied polymer Science vol. 15, pp. 2371-2380.*

Office Action issued in corresponding Chinese Patent Application No. 2005101322111; issued Jun. 20, 2008.

* cited by examiner

APPARATUS AND METHOD FOR FABRICATING FLAT PANEL DISPLAY DEVICE This application claims the benefit of the Korean Patent Application No. P2005-48613 filed on Jun. 7, 2005, which is hereby incorporated by reference.

TECHNICAL FIELD

The present invention relates to a flat panel display device, and more particularly to a method and apparatus for fabricating a flat panel display device that is adaptive for performing a patterning process without using a photo process.

DESCRIPTION OF THE RELATED ART

Recently as society has become more information-oriented, the display device has been emphasized in importance more than ever before as a visual information communication medium. A cathode ray tube or Braun tube display is currently the most popular display device used. However the CRT display is heavy and large.

As an alternative, various flat panel displays have been developed. Examples of flat panel displays include liquid crystal display LCD, field emission display FED, plasma display device PDP, electroluminescence device EL, etc. Most of these displays have been put to practical use and are presently on the market.

Among these, the liquid crystal display device is popular as the liquid crystal display device can satisfy a trend of electronic products being made light, thin, short and small. As the producibility of the liquid crystal display device has been improving, it has been rapidly replacing the cathode ray tube in many applied fields.

Specially, an active matrix type liquid crystal display device, which drives a liquid crystal cell by use of a thin film transistor (hereinafter, referred to as "TFT"), has an excellent picture quality and low power consumption. Large-sized and high-resolution active matrix type liquid crystal display devices have rapidly been developed due to the establishment of mass production technology and the result of research and development.

The active matrix type liquid crystal display device, as shown in FIG. 1, has a color filter substrate 22 and a TFT array substrate 23 bonded with a liquid crystal layer 15 therebetween. The liquid crystal display device shown in FIG. 1 represents part of the whole effective screen.

The color filter substrate 22 includes a color filter 13 and a common electrode 14 formed on the rear surface of an upper glass substrate 12. A polarizer 11 is adhered onto the rear surface of the upper glass substrate 12. The color filter 13 has red R, green G and blue B color filter layers arranged to transmit a light of a specific wavelength range, thereby enabling a color display. A black matrix (not shown) is formed between adjacent color filters 13.

The TFT array substrate 23 includes data lines 19 and gate lines 18 formed to cross each other in the front surface of a lower glass substrate 16, and TFTs 20 formed at the crossing parts. A pixel electrode 21 is formed in a cell area between the data line 19 and the gate line 18 in the front surface of the lower glass substrate 16. The TFT switches a data transmission path between the data line 19 and the pixel electrode 21 in response to a scan signal from the gate line 18, thereby driving the pixel electrode 21. A polarizer 19 is adhered to the rear surface of the TFT array substrate 23.

The liquid crystal layer 15 controls the transmitted amount of the light which is incident through the TFT array substrate 23.

The polarizers 11, 17 adhered onto the color filter substrate 22 and the TFT substrate 23 transmit polarized light in one direction, and the polarized directions thereof perpendicularly cross each other when the liquid crystal 15 is in a 90° TN mode. An alignment film (not shown) is formed in each of liquid crystal facing surfaces of the color filter substrate 22 and the TFT array substrate 23.

A fabricating process of the active matrix type liquid crystal display device can be divided into a substrate cleaning process, a substrate patterning process, an alignment film forming/rubbing process, a substrate bonding/liquid crystal injecting process, a mounting process, an inspecting process, a repairing process, etc. The substrate cleaning process uses a cleaning solution to remove impurities that have contaminated the substrate surface of the liquid crystal display device. The substrate patterning process is divided into a patterning process of the color filter substrate and a patterning process of the TFT array substrate. The alignment film forming/rubbing process spreads an alignment film over each of the color filter substrate and the TFT array substrate and rubs the alignment film with a rubbing cloth, etc. The substrate bonding/liquid crystal injecting process bonds the color filter substrate and the TFT array substrate together by use of a sealant and injects a liquid crystal and a spacer through a liquid crystal injection hole and seals the injection hole. The mounting process connects a tape carrier package (hereinafter, referred to as "TCP"), on which an integrated circuit such as a gate drive IC, a data drive IC, etc is mounted, to a pad part on the substrate. The drive IC can be mounted directly on the substrate by a method such as a chip-on-glass (hereinafter, referred to as "COG") method besides a tape automated bonding method using the foregoing TCP. The inspecting process includes electrical inspection and macrography which are conducted after forming the pixel electrode and the signal line such as the data line and the gate line on the TFT array substrate. The repairing process performs restoration on a substrate which is judged by the inspecting process to be possible to repair. A substrate which is judged to be impossible to repair is disposed as waste.

In the fabricating method of most of the flat panel display devices inclusive of the liquid crystal display device, a thin film material deposited on the substrate is patterned by a photolithography process. The photolithography process is a series of photo-process which generally includes photo-resist spreading, mask aligning, exposing, developing and cleaning. However, the photolithography process takes a relatively long time, a large amount of the photo-resist material and stripping solution are wasted, and uses expensive equipment such as exposure equipment.

SUMMARY

By way of introduction only, an apparatus for fabricating a flat panel display device (such as a liquid crystal display LCD, field emission display FED, plasma display device PDP and electroluminescence display EL) according to an aspect of the present invention includes a soft mold operative to form a designated resist pattern by applying pressure to a resist on a thin film layer on a substrate. The resist has a dipole moment μ value of at least 2 (D), and/or has a solubility parameter value lower than 6 $(cal/cm^3)^{1/2}$ or higher than 11 $(cal/cm^3)^{1/2}$.

In the fabricating apparatus, the resist may include EGDMA (ethylene glycol dimetharcylate), HPA (hydroxypropyl arcylate) and/or DGDMA (diethylene glycol dimetharcylate). In this case, the EGDMA, HPA, and/or DGDMA may be about 20~70% of the whole composition of the resist, and the resist may further include an adhesive promoter and/or a silane coupling agent. In addition, the soft mold may include PDMS (polydimethylsiloxane) having a solubility parameter value of about 7.3 $(cal/cm^3)^{1/2}$.

A method for fabricating a flat panel display device according to another aspect of the present invention includes forming a thin film layer on a substrate; forming a resist on the substrate, wherein the resist has a dipole moment $\mu$ value of at least 2 (D), and/or has a solubility parameter value lower than 6 $(cal/cm^3)^{1/2}$ or higher than 11 $(cal/cm^3)^{1/2}$; forming a resist pattern by applying pressure to the resist with a soft mold which has a designated groove; and forming a thin film pattern by removing a thin film layer which does not overlap the resist pattern.

A method for fabricating a flat panel display device according to another aspect of the present invention includes: forming a thin film layer on a substrate; aligning a soft mold over the substrate; selecting a resist such that at least one of: the resist has at least a predetermined dipole moment or a solubility parameter of the resist is substantially different from a solubility parameter of the soft mold, such that the soft mold does not absorb a substantial amount of the resist; depositing the resist on the thin film layer; forming a resist pattern without using a photolithography process by applying pressure to the resist with a soft mold which has a designated groove; and forming a thin film pattern by removing a thin film layer which does not overlap the resist pattern.

BRIEF DESCRIPTION OF THE DRAWINGS

The invention will be apparent from the following detailed description of the embodiments with reference to the accompanying drawings, in which.

DETAILED DESCRIPTION OF THE PREFERRED EMBODIMENT

Reference will now be made in detail to the preferred embodiments of the present invention, examples of which are illustrated in the accompanying drawings.

Figure 1:
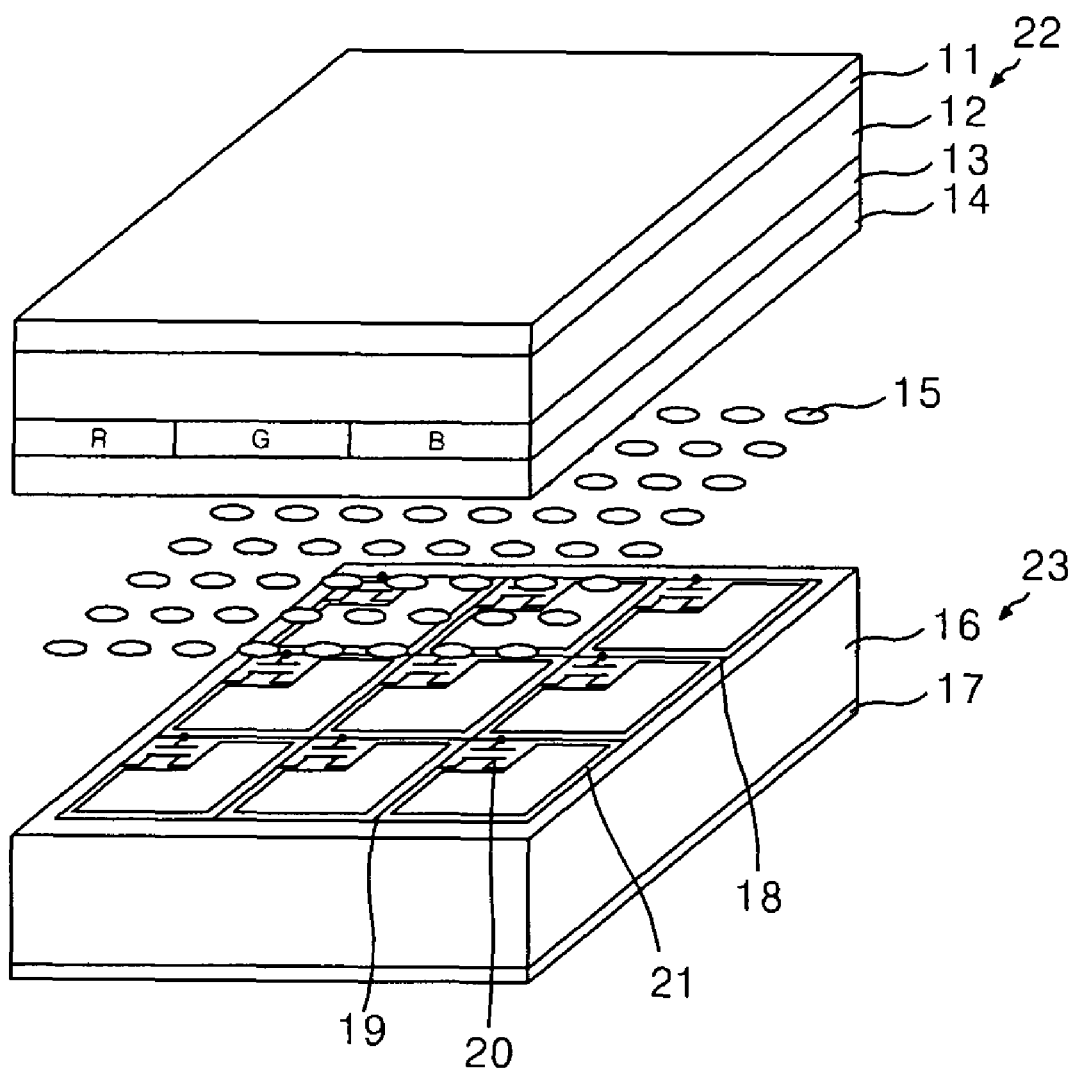
FIG. 1 is a perspective plan view representing an active matrix type liquid crystal display device.
Figure 2:
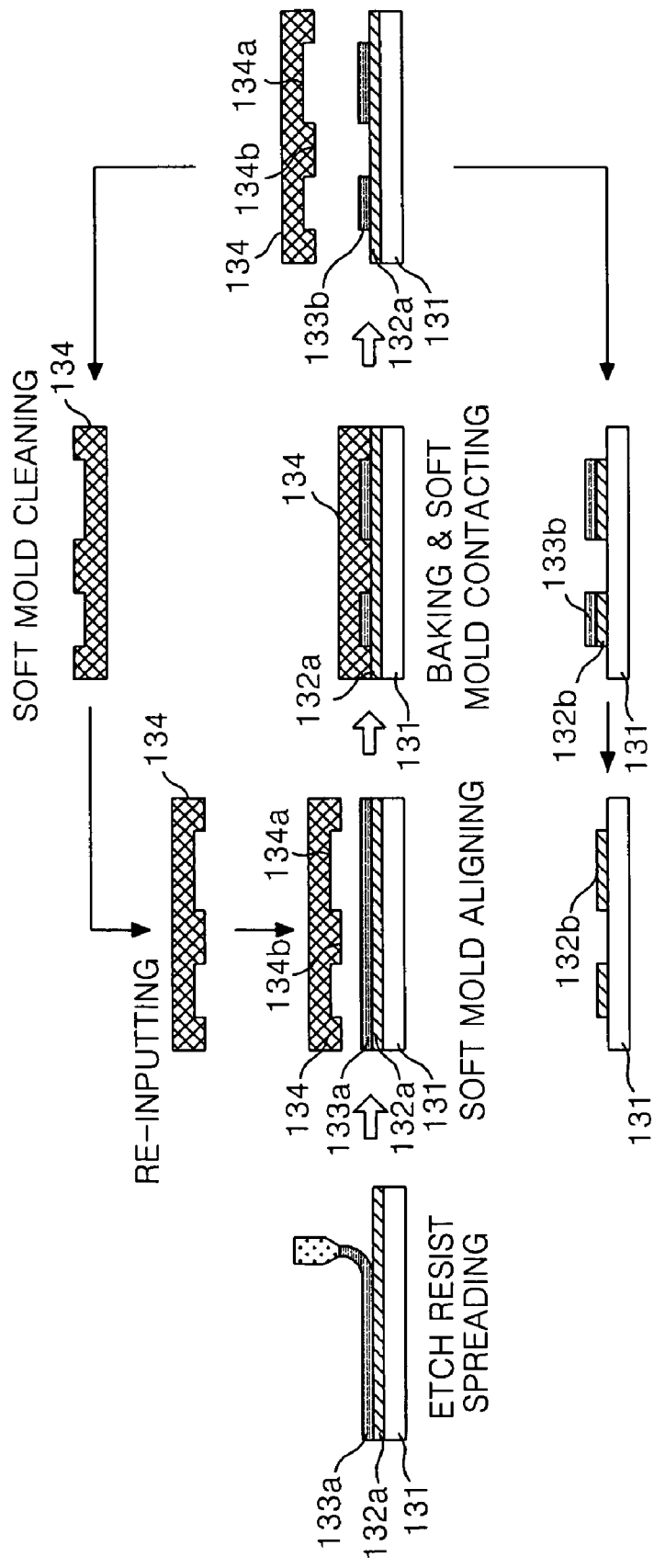
FIG. 2 is a diagram for explaining a method and apparatus for fabricating a flat panel display device according to an embodiment of the present invention.
Figure 3:
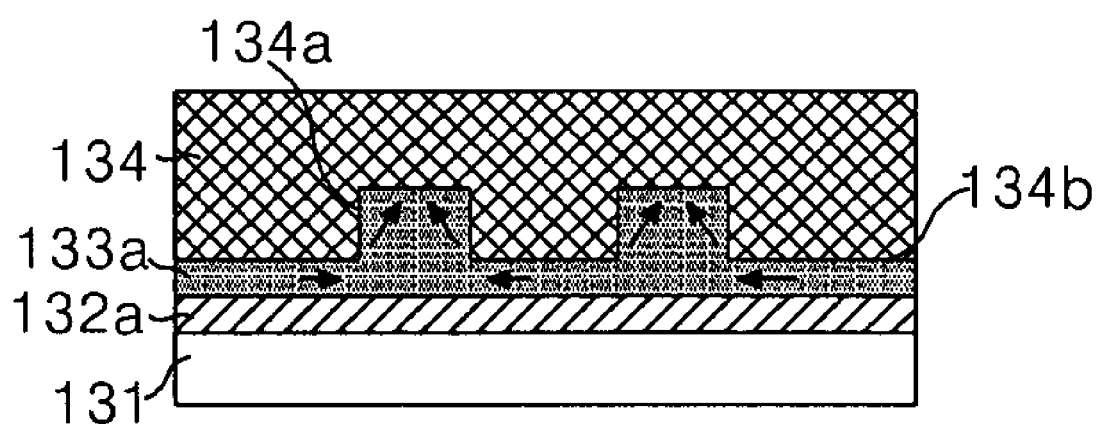
FIG. 3 is a diagram representing movement of an etch resist solution when a soft mold of FIG. 2 is in contact with a substrate of FIG. 2.
Figure 4:
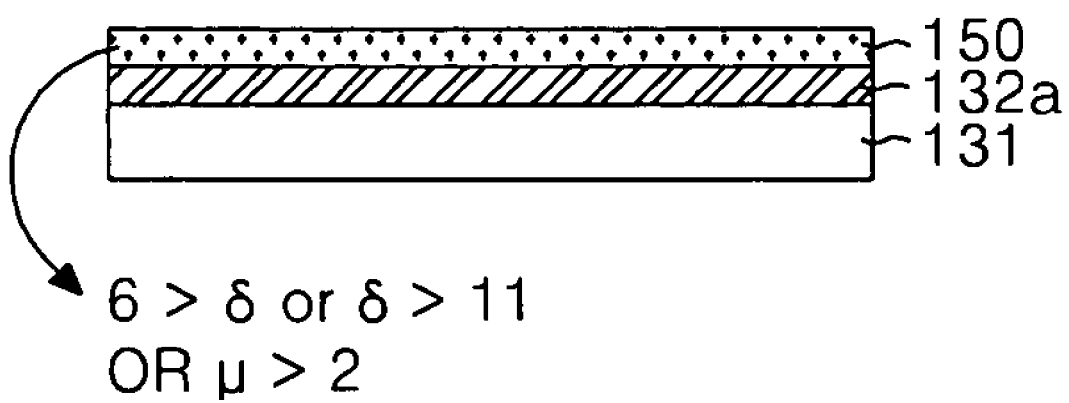
FIG. 4 is a diagram representing a substrate in which an etch resist that is not absorbed into a soft mold is formed.

With reference to FIGS. 2 to 4, embodiments of the present invention will be explained as follows.

Referring to FIGS. 2 and 3, a fabricating method of a flat panel display device according to an embodiment of the present invention can form a desired thin film pattern using a soft mold 134 instead of a photo-resist pattern process of the related art.

The thin film pattern process using the soft mold 134 includes a spreading process of an etch resist solution 133a on a substrate 131 where a thin film 132a is formed, a patterning process of an etch resist layer 133 using a soft mold 134, an etching process for patterning the thin film 132a, a stripping process of a residual etching resist pattern, and an inspecting process.

The thin film 132a formed on the substrate 131 is formed of a basic material, which is used as a metal pattern, an organic matter pattern and an inorganic matter pattern that exist in an array of the flat panel display device, on the substrate 131 by a known spreading process or deposition process.

The etch resist solution 133a includes a resin, which is a liquid polymer precursor or liquid monomer, an activator, an initiator, and/or a thermal flow derivative, etc.

The etch resist solution 133a is spread over the thin film 132a by a spreading process such as nozzle spraying, spin coating, etc.

The soft mold 134 is made of a rubber material with high elasticity such as polydimethylsiloxane PDMS, polyurethane, cross-linked novolac resin, etc, and has a groove 134a corresponding to a pattern which is to remain on the substrate 131. Herein, the soft mold 134 having the groove 134a and a projected surface 134b is surface-treated to be hydrophobic or hydrophilic. Hereinafter, an explanation will be made assuming that the soft mold 134 is hydrophobic in the present invention.

The soft mold 134 is aligned on the etch resist solution 133a, and then a pressure with which the soft mode can only be in contact with the thin film 132a, i.e., a pressure of only about its own weight, is applied to the etch resist solution 133a.

For example, the etch resist solution 133a, as shown in FIG. 3, moves into the groove 134a of the soft mold 134 by a capillary force which is generated by a pressure between the soft mold 134 and the glass substrate 131, and a repulsive force between the soft mold 134 and the etch resist solution 132a. As a result, the etch resist pattern 133b is formed on the thin film 132a in a pattern shape that is the inverse of the groove 134a pattern of the soft mold 134. That is, the inverse of the groove 134a pattern of the soft mold 134 is transferred to form the etch resist pattern 133b. Subsequently, after the soft mold 134 is separated from the substrate 131, a wet etching process or a dry etching process is performed. The etch resist pattern 133b acts as a mask, thus only the thin film 132a located in a lower part of the etch resist pattern 133b remains on the substrate 131 and the other thin film 132a is removed. Subsequently, the etch resist pattern 134b is removed by the stripping process, and whether there is a short circuit or broken wire of the thin film pattern 132b is inspected by electrical and optical inspection for the thin film pattern 132b.

After being separated from the substrate 131, the soft mold 134 is cleaned with ultraviolet radiation UV and ozone $O_3$, and then is re-supplied to a patterning process of another thin film 132a.

A small amount of the etch resist material, i.e., liquid polymer precursor material, is absorbed into the soft mold 134 if the patterning process is performed several times using the soft mold 134 and the etch resist solution 133a. The absorbed amount thereof is accelerated as the number of processes increases. Thus, the surface of the soft mold 134 eventually becomes deformed or damaged. As a result, after the soft mold 134 applies pressure to and casts the etch resist solution 133a, at some point the soft mold 134 and the substrate 131 adhered to each other. When this occurs, in the worst case scenario, the soft mold 134 and the substrate 131 have to be disposed of.

The absorption of the etch resist solution 133a into the soft mold 134 can be determined by analyzing a solubility parameter relationship between the liquid resist material and the mold material.

[MATHEMATICAL FORMULA 1]

$$\chi = (\delta_{mold} - \delta_{etch\ resist\ solution})^2 V/RT$$

$\chi$: Flory-Huggins interaction parameter $\delta$: solubility parameter

V: molar volume

R: gas constant

T: absolute temperature

In MATHEMATICAL FORMULA 1, if $\chi$ value is small, i.e., if the $\delta$ value of the soft mold 134 is similar to the $\delta$ value of the etch resist solution 133a, they mix together well, thus the etch resist solution 133a is absorbed into the soft mold 134.

Accordingly, as the $\chi$ value increases, the amount of the etch resist 133a which is absorbed into the soft mold 134 becomes smaller, thus it is possible to prevent damage to the soft mold 134.

Further, even though the solubility parameters of the soft mold 134 and the etch resist solution 133a are similar to each other, they might not affect the soft mold 134 in accordance with polarity. For example, if the soft mold 134 is strongly hydrophobic, less effect is given thereon as the polarity, e.g., hydrophilicity, of the etch resist solution 133a is increases.

Accordingly, a resist material which is not absorbed into the soft mold 134 is used to extend the lifespan of the soft mold 134.

Firstly, a material forming the soft mold 134 and/or the resist material is/are selected such that the solubility parameter difference between the soft mold 134 and the resist material is large. This limits absorption of the etch resist into the soft mold 134.

If PDMS is used as the soft mold material, the solubility parameter value of hardened PDMS is about 7.3 $(cal/cm^3)^{1/2}$. The solubility parameter value for which the resist material is not appreciably absorbed into the soft mold 134 satisfies MATHEMATICAL FORMULA 2.

$$6 > \delta \text{ or } \delta > 11 \qquad \text{[MATHEMATICAL FORMULA 2]}$$

Using PDMS, resist materials whose solubility parameter value satisfies MATHEMATICAL FORMULA 2 are provided in TABLE 1.

TABLE 1

| Material Name | Solubility Parameter $(cal/cm^3)^{1/2}$ |
|---|---|
| EGDMA (ethylene glycol dimetharcylate) | 4.48 |
| HPA (hydroxypropyl acrylate) | 11.26 |
| DGDMA (diethylene glycol dimetharcylate) | 11.02 |

Other etch resist materials may be used. For example, etch resist materials in which one or more of the materials shown in TABLE 1 is mixed into an etch resist resin material may be used. Such resins include an adhesion promoter or a silane coupling agent.

By using an etch resist material having a solubility parameter value that satisfies MATHEMATICAL FORMULA 2, it is possible to prevent the etch resist from being absorbed into the soft mold when patterning the thin film. As a result, damage of the soft mold may be minimized, thereby extending the lifespan of the soft mold.

Further, an overcoat layer or pattern spacer can be formed using a resin mixed with a material shown in TABLE 1. Herein, the amount of material shown in TABLE 1 which is included in the etch resist is about 20~70% of the entire etch resist material. The entire etch resist material may contain up to about 10% of an adhesion promoter or silane coupling agent.

Secondly, if a dipole moment $\mu$ of the resist has a value higher than 2 (D) even if the solubility parameter value of the resist is $6 < \delta < 11$, the resist is not absorbed into the soft mold. The unit (D) is a debye, 1 debye=$3.33 \times 10^{-30}$ (Cm).

For example, acetone and methylene chloride are solvents in which $\delta$ is about 9.9. Typically, the absorption rate of acetone and methylene chloride into hardened PDMS is about 22% for methylene chloride and about 6% for acetone. This is because the dipole moment $\mu$ is 1.6 D for methylene chloride but the dipole moment $\mu$ is 2.88 D for acetone. Thus, the rate of absorption into the soft mold is different in accordance with the dipole moment $\mu$ even for materials with the same solubility parameter.

In this way, the fabricating apparatus of the flat panel display device according to the present invention uses an etch resist material that includes a material which is not absorbed into the soft mold 134 in order to extend the lifespan of the soft mold 134 that is used to form the thin film pattern. As a result, the etch resist is prevented from being absorbed into the soft mold 134 even though the patterning process using the soft mold 134 is performed several times, thereby extending the lifespan of the soft mold.

Hereinafter, the process of forming the thin film by use of the etch resist material according to the present invention is explained as follows.

Referring to FIG. 4, after the thin film layer 132A is formed on the substrate 131, an etch resist solution 150 inclusive of at least any one material of the materials which are shown in TABLE 1 or of which the solubility parameter value satisfies MATHEMATICAL FORMULA 2 is spread. Herein, the etch resist solution 150 might includes the material of which the dipole moment $\mu$ has a value higher than 2(D).

After the soft mold 134 is aligned on the etch resist solution 150, pressure is applied to the etch resist solution 150 to mold the etch resist solution 150, thereby forming the etch resist pattern. Hereinafter, the same process shown in FIGS. 2 and 3 is repeated.

In this way, the etch resist material which is not absorbed into the soft mold 134 is used in the patterning process using the soft mold 134, thereby improving the lifespan of the soft mold 134.

The method and apparatus for fabricating the flat panel display device according to the present invention can be applied to a process for patterning an electrode layer, an organic matter layer, an inorganic matter layer, etc. . . . of various flat panel display devices such as liquid crystal display LCD, field emission display FED, plasma display device PDP, electroluminescence EL, etc.

As described above, the method of the flat panel display device according to the present invention forms the thin film pattern by use of the soft mold and the etch resist, not by a photo-process, thus its fabricating process is simplified.

Further, in the method and apparatus for fabricating the flat panel display device of the present invention, the etch resist has a solubility parameter value and/or a dipole moment $\mu$ value that satisfies designated values (MATHEMATICAL FORMULA 2 or $\mu > 2$). The etch resist material is made so as not to be absorbed into the soft mold, thereby mitigating damage of the soft mold. As a result, the lifespan of the soft mold is improved.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. An apparatus for fabricating a flat panel display device, comprising:

a resist formed on a substrate, a soft mold having a groove and a projected surface, for forming a designated resist pattern by moving the resist to the groove with a pressure applied after contacting the resist to the projected surface, wherein the resist has a dipole moment µ value equal to or higher than 2(D), or has a solubility parameter value lower than 6 $(cal/cm^3)^{1/2}$ or higher than 11 $(cal/cm^3)^{1/2}$ such that a solubility parameter difference between the soft mold and the resist is large and absorption of the resist into the soft mold is limited, wherein the soft mold is PDMS (polydimethylsiloxane), and a solubility parameter value of the PDMS is about 7.3 $(cal/cm^3)^{1/2}$.

2. The apparatus according to claim 1, wherein the resist further comprises at least one of an adhesive promoter and a silane coupling agent.

3. The apparatus according to claim 1, wherein the flat panel display device comprises one of a liquid crystal display LCD, a field emission display FED, a plasma display device PDP, or an electroluminescence device EL.

4. The apparatus according to claim 1, wherein the resist includes at least one of EGDMA (ethylene glycol dimetharcylate), HPA (hydroxypropyl arcylate), or DGDMA (diethylene glycol dimetharcylate).

5. The apparatus according to claim 4, wherein the at least one of the EGDMA, HPA, or DGDMA is about 20~70% of the whole composition of the resist.

* * * * *